United States Patent [19]
Edlinger

[11] Patent Number: 6,082,640
[45] Date of Patent: Jul. 4, 2000

[54] METHOD FOR GRANULATING AND GRINDING MOLTEN MATERIAL AND DEVICE FOR CARRYING OUT SAID METHOD

[75] Inventor: Alfred Edlinger, Baden, Switzerland

[73] Assignee: "Holderbank"Financiere Glarus AG, Glarus, Switzerland

[21] Appl. No.: 09/331,886

[22] PCT Filed: Oct. 14, 1998

[86] PCT No.: PCT/AT98/00243

§ 371 Date: Jun. 29, 1999

§ 102(e) Date: Jun. 29, 1999

[87] PCT Pub. No.: WO99/22031

PCT Pub. Date: May 6, 1999

[30] Foreign Application Priority Data

Oct. 29, 1997 [AT] Austria ..................................... 1826/97

[51] Int. Cl.[7] .................................................. C21B 3/08
[52] U.S. Cl. ................................... 241/1; 241/5; 241/15; 241/17; 241/38; 241/41
[58] Field of Search ............................. 241/1, 5, 15, 16, 241/17, 18, 38, 39, 41, 42, 43, 44

[56] References Cited

U.S. PATENT DOCUMENTS

| | | |
|---|---|---|
| 3,615,329 | 10/1971 | Jones ............................................ 65/71 |
| 4,218,201 | 8/1980 | Kozima et al. . |
| 4,909,837 | 3/1990 | Hansen et al. ............................... 264/8 |
| 5,441,205 | 8/1995 | Kanazumi et al. ......................... 241/41 |
| 5,667,147 | 9/1997 | Edlinger ....................................... 241/1 |
| 5,992,773 | 11/1999 | Schwechten ................................ 241/5 |

FOREIGN PATENT DOCUMENTS 1 184 689  12/1964  Germany .
95/15402   6/1995   WIPO .

OTHER PUBLICATIONS

Patent Abstract Of Japan vol. 006, No. 019 (C–090), Feb. 3, 1982 & JP 56 142806 A Nov. 7, 1981, Uozumi Ikuo.
Patent Abstract Of Japan, vol. 006, No. 231 (C–135), Nov. 17, 1982 & JP 57 134501 A, Aug. 19, 1982, Iowa Norita.

*Primary Examiner*—John M. Husar
*Attorney, Agent, or Firm*—Pillsbury Madison & Sutro LLP

[57] ABSTRACT

In a process for granulating and comminuting molten material, the slag melt is acted upon by compressed water and discharged together with the vapour formed. The liquid slag is introduced into a granulation chamber in a free flowing jet while directing compressed water jets against the slag jet, whereupon the solidified and granulated slag is conducted through a pneumatic conveyor duct and a distributor along with the vapour formed. The partial streams leaving the distributor, via conically tapering nozzles are transferred into a grinding space exhibiting a lower pressure than the granulation space and from which the comminuted and solidified material is drawn off.

22 Claims, 4 Drawing Sheets

METHOD FOR GRANULATING AND GRINDING MOLTEN MATERIAL AND DEVICE FOR CARRYING OUT SAID METHOD

This application is the national phase of international application PCT/AT98/00243 filed Oct. 14, 1998, which designated the U.S.

BACKGROUND OF THE INVENTION

1. Field of the Invention

The invention relates to a process for granulating and comminuting molten material, in which the slag melt is acted upon by compressed water and discharged together with at least a portion of the vapour formed, as well as a device for carrying out this process.

2. Prior Art

Metallurgical slags of suitable chemical compositions are frequently granulated, i.e., quenched with water out of the melt flow with a view to largely preventing crystallization by rapid solidification and obtaining an amorphous glassy granule structure instead. Such granulates are valuable raw materials for the production of hydraulic binders. The production of such binders calls for the additional steps of drying and fine grinding the granulates, and hence two further energy-consuming processes.

Austrian Patent No. 400 140 has already described a process for granulating and comminuting molten material and grinding material as well as a device for carrying out this process, in which the melt is introduced into a mixing chamber under pressure and compressed water vapour or water vapour mixtures are nozzled into the mixing chamber. Due to the rapid expansion a pressure was built up in that known process, which, via a diffuser, caused the rapid ejection of the solidified particles. The kinetic energy of the rapidly ejected particles in that device could be utilized for comminution, wherein the jet emerging from the diffuser could be directed against a baffle plate or a jet emerging from a further diffuser. As in contrast to the conventional granulation of molten blast furnace slag with water, such a mode of procedure enables the slag melt heat to be thermodynamically and technically utilized in a better way. By cooling in water, the low temperature heat developing can be utilized to an insufficient degree only. The same applies for the known cooling of molten steel slags by giving off heat through radiation or convection. The use of compressed water for acting upon slag melts while simultaneously utilizing for comminution the kinetic energy gained in that manner has already constituted an essential improvement in this respect.

SUMMARY OF THE INVENTION

The invention aims at further developing a process of the initially defined kind with a view to further improving the utilization of slag melt heat for comminution or surface enlargement operations while lowering energy consumption and, at the same time, providing the opportunity of substantially suppressing $H_2S$ degassing. To solve this object, the process according to the invention essentially consists in that the liquid slag is introduced into a granulation chamber in a free flowing jet, compressed water jets are directed against the slag jet, whereupon the solidified and granulated slag is conducted through a pneumatic conveyor duct and a distributor together with at least a portion of the vapour formed and the partial streams leaving the distributor, via conically tapering nozzles, are transferred into a grinding space exhibiting a lower pressure than the granulation space and from which the comminuted and solidified material is drawn off. By directing compressed water against the slag jet, the prerequisite for hydrogen sulphide formed being included in the slag solidifying under pressure is provided such that only substantially slighter residual amounts of $H_2S$ will be observed in the concentrated exhaust vapour stream and intensive and rapid cooling will be obtained, thereby directly enabling further comminution, for instance in a fluidized-bed counter jet mill or in the fluidized bed, via a connected duct and appropriate distribution. To this end, the process according to the invention is controlled in a manner that the solidified and granulated slag is conducted through a distributor along with the vapour formed. The granulated slag stream in the distributor is subdivided into further partial streams which may be introduced directly into a grinding space via conically tapering nozzles so as to effect further comminution and additional grinding in the fluidized bed of the same. In doing so, a conventional fluidized-bed counter jet mill may be employed, wherein, by the condensation of water out of the vapour stream and, in particular, in case water for cooling is nozzled into the grinding space thereby accelerating condensation after having left the grinding space, a rapid pressure drop is effected there, thus rendering feasible the obtainment of an even subatmospheric pressure such that grinding work can be done by mechanical acceleration and utilization of the condensation enthalpy. The effect of the inclusion of $H_2S$ in glassily solidifying slag may be further enhanced in that granulation is effected in a container capable of being closed in a pressure-proof manner, as in correspondence with a preferred process control.

Advantageously, the process according to the invention is carried out in a manner that the liquid slag is transferred into a slag ladle capable of being tilted and/or designed to include a bottom slide and provided within the container capable of being closed in a pressure-proof manner, and that the slag jet is formed by tilting the slag ladle or opening the bottom slide. The container capable of being closed in a pressure-proof manner thereby provides for an essential pre-requisite to effectively suppress $H_2S$ degassing, wherein a tiltable slag ladle in a simple manner allows for the formation of a slag jet, against which compressed water may be directed in order to rapidly obtain an amorphous product solidifying in the glass phase, i.e., in a metastable phase.

In a particularly advantageous manner, the process according to the invention is conducted in a manner that a portion of the vapour formed is introduced into the grinding space via vapour nozzles. Thereby, also excess vapour may energetically be utilized for the grinding procedure if the amount of vapour formed in the slag ladle exceeds the take-up capacity of the nozzles provided for introducing the granulated slag into the grinding space.

The effective suppression of undesired $H_2S$ degassing is feasible if, as in correspondence with a preferred realization of the process according to the invention, the pressure within the pressure-proof container is chosen to be between 2 and 15 bars. The process may be carried out with relatively small amounts of water so as to form overheated vapour. The high slag heat serves to overheat the saturated vapour intermediately formed, thereby preventing the formation of a liquid water phase. The addition of water, thus, may be limited to about 0.8 tons water/ton slag with pressures of 10 bars at temperatures of 450° C. and specific vapour amounts of about 900 $Nm^3$/ton slag readily resulting.

In order to further reduce offgas purification expenditures, it is advantageously proceeded in a manner that the vapour drawn off the grinding space along with the grinding material is condensed after the separation of fine stock and is recycled into the container capable of being closed in a pressure-proof manner via a compressor as compressed water, thereby enabling the remaining hydrogen sulphide to be conducted in circulation.

The separation of excess hydrogen sulphide that is not to be, or cannot be, recirculated any longer, from the amount of vapour leaving the process may subsequently be realized in a conventional manner, for instance, by applying the Claus process by oxidizing hydrogen sulphide to elementary sulphur and water.

In order to ensure that the granulated particle stream acted upon by compressed water can be effectively introduced directly into a counter jet mill, the observance of specific parameters in regard of the flow speed of the material stream leaving the pressure-proof container is of particular importance. In accordance with the invention, it is advantageously proceeded in a manner that the flow speed of the material stream leaving the pressure-proof space via the distributor is chosen to be 10 to 30 m/s, thereby ensuring that the wear in the leading-off ducts remains controllable over a long period of time and, at the same time, precompacting of the fluidized particle stream is rendered feasible by designing the duct accordingly.

In order to obtain a particularly high grinding effect in a consecutively arranged fluidized-bed counter jet mill, the plant advantageously is dimensioned such that the nozzle outlet speed within the grinding space is chosen to be 150 to 500 m/s, wherein the grinding effect may be enhanced even further in that the pressure within the grinding space is relieved to values of below 1 bar and, in particular, 0.3 to 0.5 bar following upon the nozzle mouths. Such a pressure relief within the grinding space to values of below 1 bar may be achieved in a particularly simple manner if cold water is nozzled into the grinding space in an amount in which the dew point is not reached yet, whereby, due to cooling, a rapid condensation of the vapour outside the grinding space and hence a rapid pressure decrease under the simultaneous release of the conversion enthalpy of vapour into condensed water are feasible.

In order to ensure that the grinding space is charged correctly with a view to an efficient grinding procedure, the process advantageously is carried out in a manner that the speeds of the granulate streams and the densities of the granulate streams in different ducts following upon the distributor and leading to the nozzles are chosen so as to deviate from each other by a maximum of 8% and, prefereably, a maximum of 5%. A plurality of ducts may be connected to the distributor, each leading to different nozzles, wherein the wear of such nozzles can be substantially reduced if ceramics and, in particular, silicon carbide are chosen as materials. The inner wall of the ducts and nozzles may be additionally protected from premature wear by appropriate coatings and, in particular, ceramic coatings.

The device according to the invention for carrying out the process according to the invention advantageously is designed such that the granulation chamber for the liquid slag is connected with the distributor by means of a curved duct and, in particular, a duct curved in an S-like manner, wherein the distributor is designed as a bifurcation formed as a mirror plane axially symmetrical to the plane of curvature of the curved duct. Such a curved duct in the zones of directional changes of the particle stream causes the fluidized material to be precompacted while safely avoiding agglomeration, taking into account the flow speeds chosen in a preferred manner. A plurality of such curvatures results in a compact homogenous material stream capable of being divided into partial streams in a simple manner. Advantageously, the configuration is devised such that at least two partial stream ducts having substantially equal clear cross sections and leading to the nozzles in the grinding space are connected to the distributor, the axes of the nozzle mouths advantageously being oriented to a common point in order to ensure the optimum grinding effect.

The configuration in a particularly advantageous manner is such that vapour nozzles connected with the container via ducts open into the grinding space, whereby a portion of the vapour may be introduced directly into the grinding space from the container capable of being closed in a pressure-proof manner.

In order to safeguard the outlet speeds required for obtaining a high grinding effect and, furthermore, guarantee an acceptable service life of the nozzles, the configuration advantageously is such that the conus angle of the nozzles is chosen to be between 5° and 30°, wherein the division of the stream into partial streams may be realized in a particularly simple manner without great structural difficulties if, as in correspondence with a preferred further development, the partial stream ducts are connected to a curvedly extending portion of the duct connected with the container capable of being closed in a pressure-proof manner. The partial stream ducts, thus, join the ducts in a region in which another change in the flow direction occurs so as to effect simple subdivision into partial streams. The small conus angle and the resulting length of the nozzle ensure that with the acceleration of the vapour speed also the particle stream is accelerated to a high degree.

As opposed to the operation of counter jet mills with compressed air, higher outlet speeds and hence an enhanced grinding effect may be obtained with the use of vapour as the propellant. In addition, further vapour and/or further grinding material may be injected via additional nozzles or by using multi-component nozzles.

BRIEF DESCRIPTION OF THE DRAWINGS

In the following, the invention will be explained in more detail by way of an exemplary embodiment schematically illustrated in the drawing. Therein.

DETAILED DESCRIPTION OF PREFERRED EMBODIMENTS OF THE INVENTION

Figure 1:
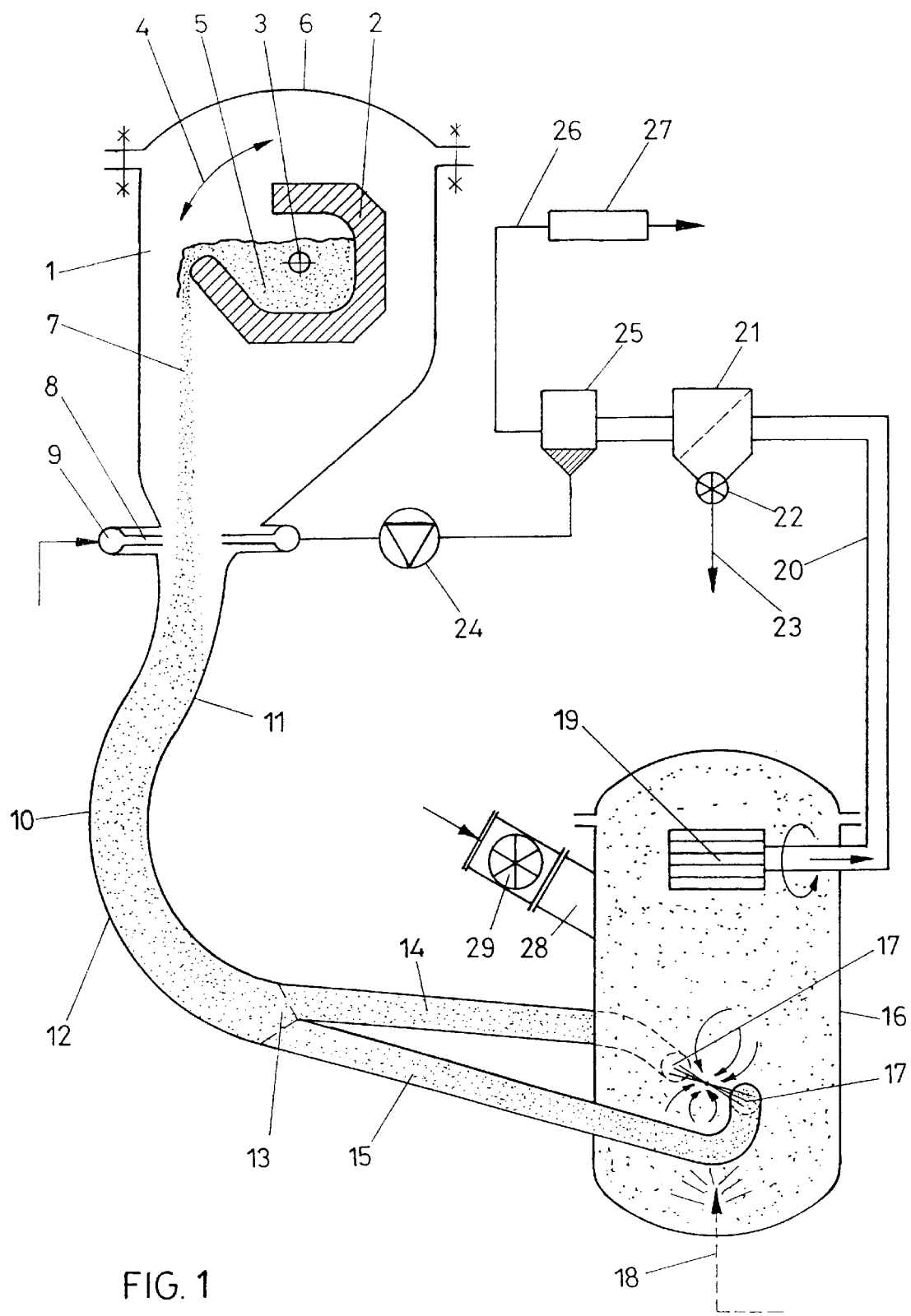
FIG. 1 is a schematic illustration of the overall plant.

FIG. 1 depicts a container 1 capable of being closed in a pressure-proof manner and in which a slag ladle 2 is arranged so as to be pivotable about an axis 3 in the direction of double arrow 4. After the introduction of slag 5 into the slag ladle 2, the lid 6 of the container 1 capable of being closed in a pressure-proof manner may be closed, whereupon a slag jet 7 may be formed upon tilting of the slag ladle 2 about the axis 3. Atomization of the slag is effected by compressed water impinging on said slag jet 7, the respective annular nozzles being indicated by 8 and the annular duct for the compressed water being indicated by 9. The illustration merely is schematic, wherein the nozzle planes may be arranged radially about the slag jet 7. These nozzles might as well be arranged to be offset in the axial direction and/or inclined relative to the slag jet with conventional nozzle shapes being applicable.

Following the impingement of compressed water on the slag jet 7 via the nozzles 8 rapid solidification occurs, the hydraulic pressure of the compressed water advantageously being selected between 40 and 60 bars in order to attain sufficient comminution to diameters of <0.6 mm. In this manner, comminutions to particle diameters down to 300 μm may be obtained. The fluidized jet leaves the container capable of being closed in a pressure-proof manner via an S-curved duct 10 with compaction occurring in the curved zones 11 and 12, which may be oriented in different directions. By adjusting the flow speed at approximately 15 m/s, a homogenous stream is safeguarded without mechanically overstressing the tube walls. The particle stream subsequently gets to a distributor 13 in which the granulates are divided with partial streams being conducted into a closed fluidized-bed jet mill 16 via ducts 14 and 15. The partial streams emerge through conically tapering nozzles 17, which causes intensive whirling within the grinding space and an accordingly high grinding effect. Into the fluidized-bed jet mill, which is designed in a substantially closed manner, water may be injected as indicated by the broken-line duct 18, wherein the dew point must not be fallen below so as to achieve a more rapid condensation and a more rapid pressure drop under further utilization of kinetic energy and rapid utilization of the conversion enthalpy of the vapour outside the grinding space. The fine stock is discharged via a screening device whose screening wheel is denoted by 19. The fine stock, along with vapour, through a duct 20 gets to a separator 21, from which the ground stock may be discharged via a sluice, in particular a cellular wheel sluice 22, and the duct 23. The vapour is then condensed, wherein the water formed may be recycled into the annular duct 9 via a pump 24. An offgas that may still contain $H_2S$ may be drawn off the gas space of the condenser 25. These gases via a duct 26 are fed to a Claus plant, in which $H_2S$ is reacted with oxygen to form $H_2O$ and sulphur. After this, gas purification may be effected as usual.

The fluidized-bed jet mill 16 may be charged with further materials to be comminuted such as, for instance, clinker, which further materials may, however, be charged through the filler neck 28 only by using a sluice such as, for instance, a cellular wheel sluice 29, taking into account the pressure level prevailing there. On account of the negative pressure in the fluidized-bed jet mill 16, this may be done also by a suction effect.

Figure 2:
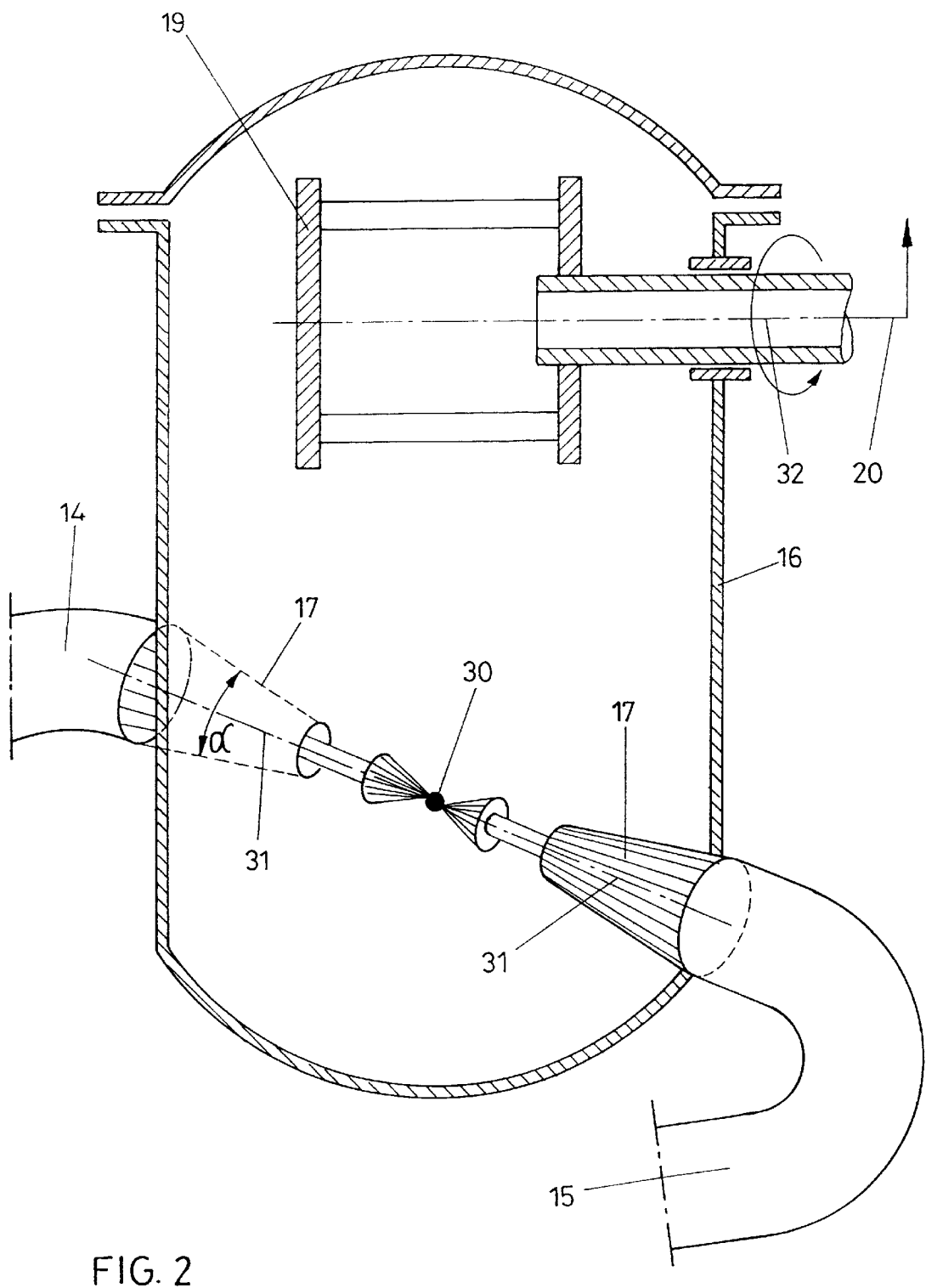
FIG. 2 is an enlarged representation of the closedly designed grinding space.

From the illustration according to FIG. 2, the configuration of the nozzles for obtaining a grinding jet is more clearly apparent. The ducts for the particle partial streams, which are denoted by 14 and 15, terminate in the interior of the fluidized-bed jet mill 16 in a grinding space, the center of which grinding space, or grinding point, is denoted by 30. The axes 31 of the nozzles 17 are directed onto this grinding space center, the conicity of the nozzles being chosen such that the angle α is between 5° and 30°. In the region of the nozzles, further acceleration to speeds of at least 150 to 300 m/s is, thus, effected. Due to the pressure drop brought about by condensation, also a high degree of kinetic energy becomes, thus, effective for the comminution work. Discharging of the fine stock again is effected via the screening wheel 19 and the hollow shaft 32 running into the duct 20.

By varying but a few parameters, filling degrees of up to 600 kg water vapour/ton slag, temperatures of about 450° C. and vapour pressures in the order of about 10 bars may, thus, be adjusted within the scope of the device according to the invention, which pressure may drop to 0.3 bar within the mill by vapour condensation.

The nozzle shape selected allows for the acceleration of the vapour jet and the slag particle jet, the low conicity being required in order to ensure that the difference in the speeds of the slag particles and of the vapour jet remains small. Thus, acceleration in the main is to be limited also to the slag particles rather than merely to the vapour jet, which is feasible by choosing the angle α as defined above accordingly small. Enhancement of the wear properties may be effected by coating the nozzles, for instance with silicon carbide.

Figure 3:
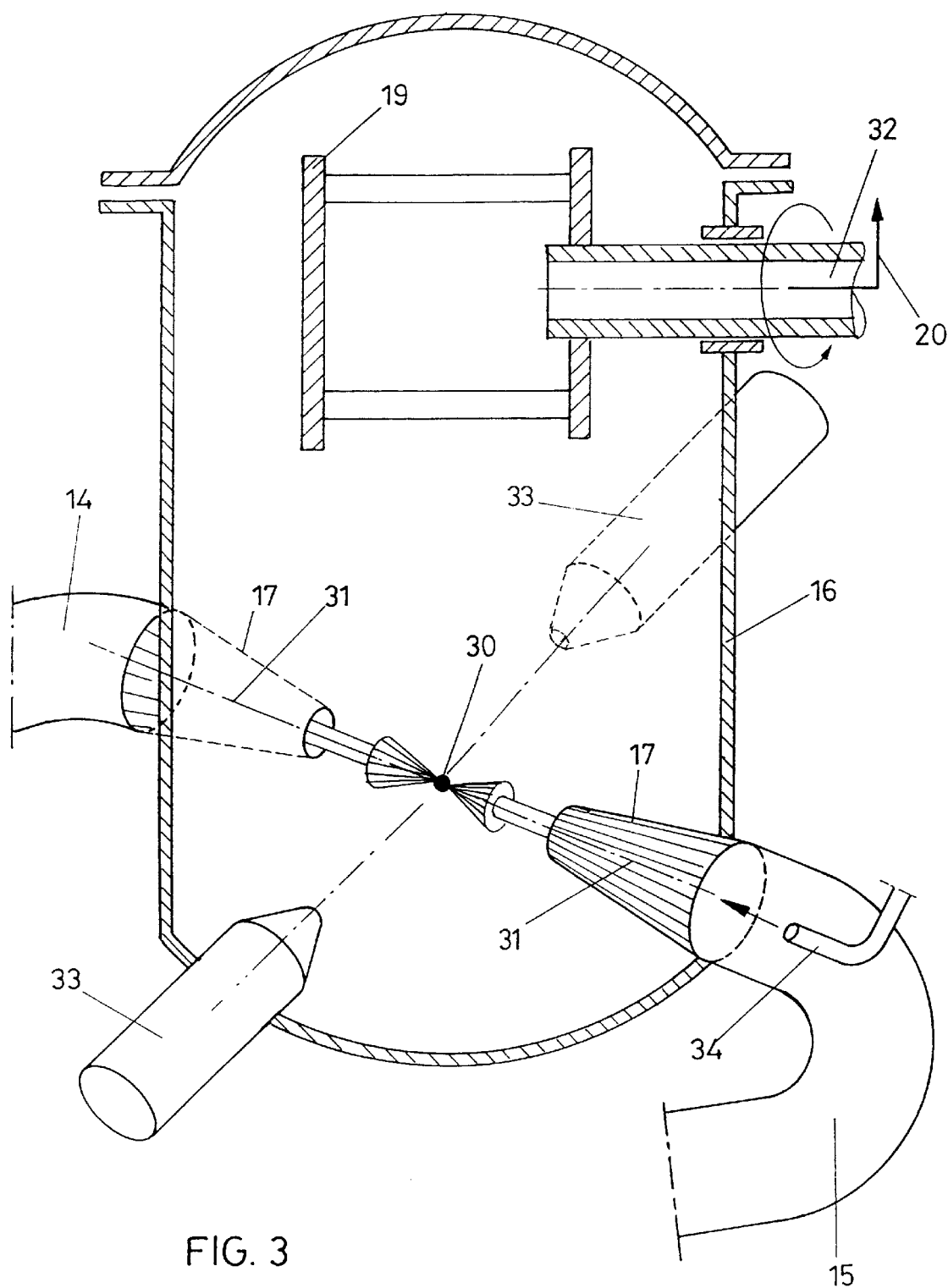
FIG. 3 is a modified configuration in the illustration according to FIG. 2.

With an assumed enthalpy difference $\Delta H=800$ kJ/kg vapour, grinding finenesses of up to 6500 Blaine ($cm^2/g$) may be attained according to the invention. The grinding fineness may, however, be increased even further by additional measures as is apparent, for instance, from FIG. 3. In that illustration, which essentially corresponds to FIG. 2, additional vapour nozzles 33 are provided, via which additional vapour may be expanded into the grinding space. Furthermore, a two-component nozzle is schematically indicated by means of a duct 34, via which additional vapour and/or additional grinding material may be introduced into nozzles 31. Introduction naturally is effected accordingly symmetrical in order to provide for the maximum of kinetic energy in the grinding point.

Figure 4:
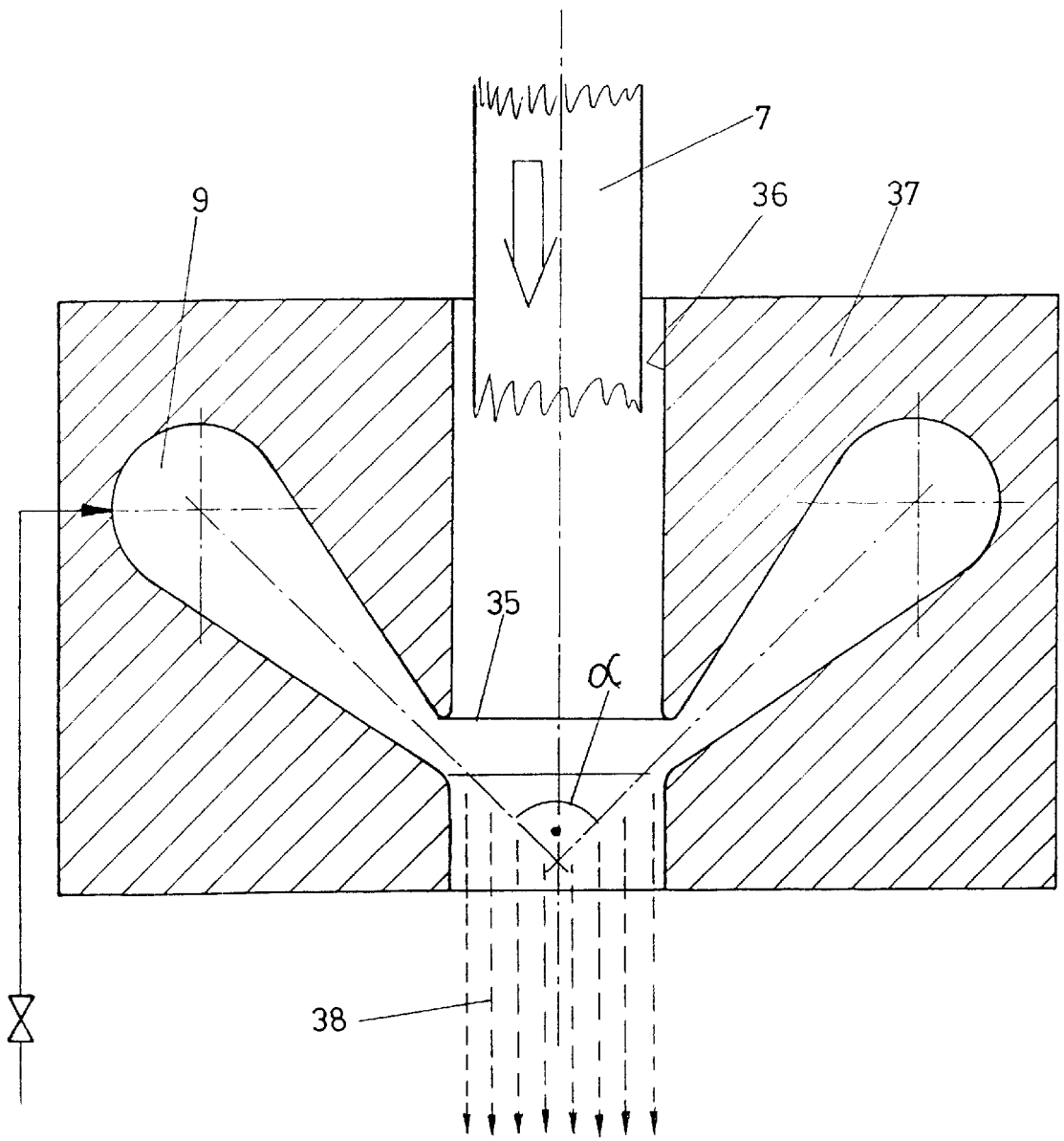
FIG. 4 is an enlarged sectional illustration through the nozzles for feeding compressed water.

In the illustration according to FIG. 4, the compressed-water nozzles, via which compressed water may be directed against the free flowing slag jet, are schematically elucidated. The slit nozzle comprises an annular channel for feeding compressed water, which is again denoted by 9 in compliance with the illustration of FIG. 1. The compressed water is ejected through the slit 35 and impinges on the free flowing liquid slag stream 7, thereby ensuring intensive and rapid glassy solidification. The granulation chamber is, thus, formed in the immediate compressed water feed zone and is geometrically limited by the wall 36 of the nozzle stock 37.

The granulates emerge in the direction of arrow 38 in the form of a microgranulate stream having an average diameter of between 300 μm and 0.5 mm. The conical angle of the slit nozzles α in that case is to amount to a maximum of 90° in order to ensure an appropriate pressure effect on the solidifying particles, thereby promoting $H_2S$ inclusion. In the nozzle stock 37, several such spraying nozzles may be sequentially arranged, whereby the granulation fineness may be enhanced accordingly.

What is claimed is:

1. A process for granulating and comminuting molten material in which a slag melt is impinged by compressed water and is discharged together with at least a portion of vapour formed as a result of the compressed water impingement, comprising the steps of:

forming a free flowing jet of slag melt in a container;

directing compressed water jets against the jet of slag melt in a granulation space to produce a solidified and granulated slag;

conducting the slag through a pneumatic conveyor duct and a distributor together with the portion of vapour formed during the production of the slag, said distributor dividing the slag and vapour into separate streams;

transferring the separate streams into a grinding space via respective conically tapered nozzles joined to the distributor, said grinding space having a lower pressure than the granulation space; and drawing off comminuted and solidified material from the grinding space.

2. A process according to claim 1, wherein said container, when closed, is pressure-proof.

3. A process according to claims 1 or 2, wherein prior to being formed as a free flowing jet, the slag melt is transferred into a slag ladle located within the container, said ladle being tiltable, or being provided with a bottom slide, for discharging the slag melt as said free flowing jet.

4. A process according to claims 1 or 2, wherein the pressure within the container is 2 to 15 bars.

5. A process according to claims 1 or 2, comprising the further steps of drawing off vapour from the grinding space, condensing the vapour into water and recycling the water into said container.

6. A process according to claims 1 or 2, wherein the slag is conducted through said duct at a flow speed of 10 to 30 m/s.

7. A process according to claims 1 or 2, wherein nozzle outlet speed from said conically tapered nozzles is 150 to 500 m/s.

8. A process according to claim 7, wherein the pressure within the grinding space is below 1 bar.

9. A process according to claim 8, wherein the pressure within the grinding space is 0.3 to 0.5 bar.

10. A process according to claims 1 or 2, wherein the pressure within the grinding space is below 1 bar.

11. A process according to claim 10, wherein the pressure within the grinding space is 0.3 to 0.5 bar.

12. A process according to claims 1 or 2, comprising the further step of relieving the pressure within the grinding space to 0.3 to 0.5 bar at a location downstream of mouths of said nozzle.

13. A process according to claims 1 or 2, wherein the speeds and densities of the slag within respective ones of said streams deviate from each other by a maximum of 8%.

14. A process according to claims 1 or 2, comprising the further steps of introducing vapour formed during the production of the slag to the grinding space via vapour nozzles.

15. Apparatus for granulating and comminuting molten material comprising:

a container within which a free flowing jet of slag melt is formed;

water jet means within said container for directing water jets against the jet of the slag melt to produce a solidified and granulated slag;

a distributor joined to said container by a duct for transporting the slag from the container to a grinding space, said duct having a substantially S-shaped curve and the distributor being formed as a bifurcation relative to a mirror plane axially symmetrical to a plane of curvature of the duct; and means for drawing off comminuted and solidified material from the grinding space.

16. Apparatus according to claim 15, wherein said bifurcation of the distributor separates the duct into at least two partial stream ducts having substantially equal cross sections, said partial stream ducts being joined to respective nozzles proximate the grinding space.

17. Apparatus according to claim 15 or 16, further comprising vapour nozzles located proximate the grinding space and joined to the container.

18. Apparatus according to claim 16, wherein said nozzles are directed onto a common point in the grinding space.

19. Apparatus according to claim 18, further comprising vapour nozzles located proximate the grinding space and joined to the container, said vapour nozzles being directed onto said common point in the grinding space.

20. Apparatus according to any one of claims 15, 16, 18, 19, 22 or 21, wherein said container, when closed, is pressure-proof.

21. Apparatus according to claim 18, wherein said nozzles are conical and have a conicity between 5° and 30°.

22. Apparatus according to claim 16, wherein said nozzle are conical and have a conicity between 5° and 30°.

* * * * *